United States Patent
Srivastava et al.

(10) Patent No.: US 7,200,588 B1
(45) Date of Patent: Apr. 3, 2007

(54) METHOD AND MECHANISM FOR ANALYZING TRACE DATA USING A DATABASE MANAGEMENT SYSTEM

(75) Inventors: Alok Kumar Srivastava, Newark, CA (US); Ivan Tinlung Lam, Santa Clara, CA (US); Sunil Kumar, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 343 days.

(21) Appl. No.: 10/209,612

(22) Filed: Jul. 29, 2002

(51) Int. Cl.
 *G06F 17/30* (2006.01)
(52) U.S. Cl. .................... 707/3; 707/102; 717/128
(58) Field of Classification Search ............. 707/1–3, 707/100–104.1, 10; 717/124, 126–130
 See application file for complete search history.

(56) References Cited

U.S. PATENT DOCUMENTS

| | | | |
|---|---|---|---|
| 3,707,725 A | 12/1972 | Dellhelm | |
| 4,462,077 A | 7/1984 | York | |
| 5,537,319 A | 7/1996 | Schoen | |
| 5,594,904 A | 1/1997 | Linnermark et al. | |
| 5,649,085 A | 7/1997 | Lehr | |
| 5,689,636 A | 11/1997 | Kleber et al. | |
| 5,708,825 A | 1/1998 | Sotomayor | |
| 5,870,606 A | 2/1999 | Lindsey | |
| 5,920,719 A | 7/1999 | Sutton et al. | |
| 5,963,740 A | 10/1999 | Srivastava et al. | |
| 6,026,362 A | 2/2000 | Kim et al. | |
| 6,083,281 A | 7/2000 | Diec et al. | |
| 6,164,841 A | 12/2000 | Mattson, Jr. et al. | |
| 6,189,141 B1 | 2/2001 | Benitez et al. | |
| 6,202,099 B1* | 3/2001 | Gillies et al. | 719/317 |
| 6,202,199 B1 | 3/2001 | Wygodny et al. | |
| 6,282,701 B1 | 8/2001 | Wygodny et al. | |
| 6,289,503 B1 | 9/2001 | Berry et al. | |
| 6,311,326 B1 | 10/2001 | Shagam | |
| 6,338,159 B1 | 1/2002 | Alexander, III et al. | |
| 6,339,775 B1* | 1/2002 | Zamanian et al. | 707/101 |
| 6,349,406 B1 | 2/2002 | Levine et al. | |
| 6,351,844 B1 | 2/2002 | Bala | |
| 6,353,898 B1 | 3/2002 | Wipfel et al. | |
| 6,353,924 B1 | 3/2002 | Ayers et al. | |
| 6,470,349 B1 | 10/2002 | Heninger et al. | |
| 6,480,886 B1* | 11/2002 | Paice | 709/208 |
| 6,507,805 B1 | 1/2003 | Gordon et al. | |
| 6,513,155 B1 | 1/2003 | Alexander, III et al. | |
| 6,546,548 B1 | 4/2003 | Berry et al. | |
| 6,553,564 B1 | 4/2003 | Alexander, III et al. | |

(Continued)

OTHER PUBLICATIONS

Agosti, M. and A. Smeaton *Information Retrieval and Hypertext* (1996) Kluwer Academic Publishers, Norwell, MA.

(Continued)

*Primary Examiner*—Debbie M. Le
(74) *Attorney, Agent, or Firm*—Bingham McCutchen LLP

(57) ABSTRACT

The present invention provides a method and mechanism for analyzing trace data using a database management system (DBMS). According to an embodiment, trace data may be loaded onto one or more databases within a DBMS. With this aspect of the invention, several advantages are gained, including the ability to use the query tool of the DBMS to analyze the trace data and the ability to build a trace repository to analyze the history of the trace data.

38 Claims, 5 Drawing Sheets

U.S. PATENT DOCUMENTS

| | | | |
|---|---|---|---|
| 6,574,792 | B1 | 6/2003 | Easton |
| 6,598,012 | B1 | 7/2003 | Berry et al. |
| 6,654,749 | B1 | 11/2003 | Nashed |
| 6,658,652 | B1 | 12/2003 | Alexander, III et al. |
| 6,678,883 | B1 | 1/2004 | Berry et al. |
| 6,694,507 | B2 | 2/2004 | Arnold et al. |
| 6,708,173 | B1 | 3/2004 | Behr et al. |
| 6,715,140 | B1 | 3/2004 | Haga |
| 6,732,095 | B1* | 5/2004 | Warshavsky et al. .......... 707/5 |
| 6,738,778 | B1 | 5/2004 | Williamson et al. |
| 6,738,965 | B1 | 5/2004 | Webster |
| 6,748,583 | B2 | 6/2004 | Aizenbud-Reshef et al. |
| 6,751,753 | B2 | 6/2004 | Nguyen et al. |
| 6,754,890 | B1 | 6/2004 | Berry et al. |
| 6,802,054 | B2 | 10/2004 | Faraj |
| 6,826,747 | B1 | 11/2004 | Augsburg et al. |
| 6,877,081 | B2 | 4/2005 | Herger et al. |
| 2001/0011360 | A1 | 8/2001 | Shigeta |
| 2002/0004803 | A1 | 1/2002 | Serebrennikov |
| 2002/0016771 | A1* | 2/2002 | Carothers et al. ............. 705/43 |
| 2002/0019837 | A1 | 2/2002 | Balnaves |
| 2002/0066081 | A1 | 5/2002 | Duesterwald et al. |
| 2002/0073063 | A1* | 6/2002 | Faraj ............................. 707/1 |
| 2002/0078143 | A1 | 6/2002 | DeBoor et al. |
| 2002/0087592 | A1* | 7/2002 | Ghani ........................ 707/500 |
| 2002/0087949 | A1* | 7/2002 | Golender et al. ........... 717/124 |
| 2002/0095660 | A1 | 7/2002 | O'Brien et al. |
| 2002/0107882 | A1 | 8/2002 | Gorelick et al. |
| 2002/0120634 | A1* | 8/2002 | Min et al. ................... 707/200 |
| 2002/0161672 | A1* | 10/2002 | Banks et al. .................. 705/27 |
| 2003/0088854 | A1 | 5/2003 | Wygodny et al. |
| 2003/0140045 | A1 | 7/2003 | Heninger et al. |
| 2004/0158819 | A1 | 8/2004 | Cuomo et al. |
| 2004/0205718 | A1 | 10/2004 | Reynders |
| 2004/0216091 | A1 | 10/2004 | Groeschel |
| 2004/0216092 | A1 | 10/2004 | Ayers et al. |

OTHER PUBLICATIONS

Akscyn, R. et al. "KMS: A Distributed Hypermedia System for Managing Knowledge in Organizations." *Hypertext '87 Proceedings* Chapel Hill, NC. (Nov. 13-15, 1987) pp. 1-20.

Berners-Lee, T. and L. Masinter, eds. (Dec. 1994) "Uniform Resource Identifiers (URI): Generic Syntax" (Aug. 1998) pp. 1-38, located at http://ftp.ics.uci.edu/pub/ietf/uri/rfc2396.txt.

Biswas, P. et al. "Trace Driven Analysis of Write Caching Policies for Disks" *Proceedings of the 1993 ACM SIGMETRICS Conference on Measurement and Modeling of Computer Systems* (1993) pp. 13-23.

Borg, A. et al. "Generation and Analysis of Very Long Address Traces" *Proceedings of the 17th Annual International Symposium on Computer Architecture* (May 1990) 18(3):270-279.

Bradner, S., ed. "Key words for use in RFCs to Indicate Requirement Levels" *Internet Engineering Task Force* (Mar. 1997) pp. 1-3, located at http://www.ietf.org/rfc/rfc2119.txt.

Bray, T. et al., eds. "Namespaces in XML" World Wide Web Consortium (Jan. 1999) pp. 1-12, located at http://www.w3.org/TR/REC-xml-names/.

Bray, T. et al., eds. "Extensible Markup Language (XML) 1.0 (Second Edition)" World Wide Web Consortium (Oct. 2000) pp. 1-58, located at http://www.w3.org/TR/REC-xml-20001006.

Bush, V. "As We May Think." *Atlantic Monthly* (Jul. 1945) 176:101-108.

Catano, J. V. "Poetry and Computers: Experimenting with the Communal Text." *Computers and the Humanities* (1979) 13(9):269-275.

Chang, P. P. and W.-M. W. Hwu "Trace Selection for Compiling Large C Application Programs to Microcode" *Proceedings of the 21st Annual Workshop on Microprogramming and Microarchitecture* (Jan. 1988) pp. 21-29.

Clark, J. and S. DeRose, eds. "XML Path Language (XPath), Version 1.0" World Wide Web Consortium (1999) pp. 1-37, located at http://www.w3.org/TR/xpath.

Colby, C. and P. Lee "Trace-Based Program Analysis" *Proceedings of the 23rd ACM SIGPLAN-SIGACT Symposium on Principles of Programming Languages* (Jan. 1996) pp. 195-207.

Conklin, J. "Hypertext: An Introduction and Survey." *Microelectr. & Comp. Technol. Corp., Software Technology Program* (Sep. 1987) 20(9):17-41.

Cowan, J. and D. Megginson, eds. "XML Information Set" World Wide Web Consortium (Dec. 1999) pp. 1-22, located at http://www.w3.org/TR/1999/WD-xml-infoset-19991220.

Dan, A. et al. "Characterization of Database Access Pattern for Analytic Prediction of Buffer Hit Probability" *VLBD Journal* (1995) 4:127-154.

DeRose, S. and A. van Dam "Document structure and markup in the FRESS Hypertext System" *Markup Languages: Theory & Practice* (Winter 1999) 1(1):7-32.

DeRose, S., ed. "XML XLink Requirements Version 1.0" World Wide Web Consortium (Feb. 1999), pp. 1-13, located at http://www.w3.org/TR/NOTE-xlink-req/.

DeRose, S., ed. "XML XPointer Language Requirements Version 1.0" World Wide Web Consortium (Feb. 1999) pp. 1-13, located at http://www.w3.org/TR/NOTE-xptr-req.

DeRose, S. et al., ed. "XML Linking Language (XLink) Version 1.0" World Wide Web Consortium (Dec. 2000) pp. 1-39, located at http://www.w3.org/TR/2000/PR-xlink-20001220/.

DeRose, S. J. "Expanding the Notion of Links." *Hypertext '89 Proceedings*, Pittsburgh, PA (Nov. 5-8, 1989) pp. 249-257.

Ducassé, M. "Coca: An automated Debugger for C" *Proceedings of the 21st International Conference on Software Engineering* (May 1999) pp. 504-513.

Dürst, M. et al., eds. "Character Model for the World Wide Web 1.0" World Wide Web Consortium (Jan. 2001) pp. 1-31, located at http://www.w3.org/TR/2001/WD-charmod-20010126/.

Engelbart, D. C. "A Conceptual Framework for the Augmentation of Man's Intellect". In *Computer-Supported Cooperative Work: A Book of Readings* (1988), pp. 36-65, I. Greif, ed., Morgan Kaufmann Publishers, Inc., San Mateo, CA.

Ezust, S.A. and G. v. Bochmann "An Automatic Trace Analysis Tool Generator for Estelle Specifications" *Proceedings of the Conference on Applications, Technologies, Architectures and Protocols for Computer Communication* (Oct. 1995) 25(4):175-184.

Furuta, R. et al. "Hypertext Paths and the World-Wide Web: Experiences with Walden's Paths" *Proceedings of the ACM Conference on Hypertext '97* Southhampton, UK (Apr. 6-11, 1997) pp. 167-176.

Garrett, L. N. et al. "Intermedia: Issues, Strategies, and Tactics in the Design of a Hypermedia Document System." *Proceedings of the Conference on Computer-Supported Cooperative Work* (1986) pp. 163-174.

Gibson, D. et al. "Inferring Web Communities from Link Topology" *Proceedings of the 1998 9th ACM Conference on Hypertext and Hypermedia*, Pittsburgh, PA (Jun. 20-24, 1998) pp. 225-234.

Goldfarb, C.F. et al., eds. "Information technology—Hypermedia/Time-based Structuring Language (HyTime)" 2nd ed. International Organization for Standardization (1992) located at http://www.ornl.gov/sgml/wg8/docs/n1920/html/n1920.html.

Goldszmidt, G. S. and S. Yemini "High-Level Language Debugging for Concurrent Programs" *ACM Transactions on Computer Systems (TOCS)* (Nov. 1990) 8(4):311-336.

Grønbæk, K. and R. H. Trigg "Toward a Dexter-based model for open hypermedia: Unifying embedded references and link objects" In *Proceedings of Hypertext '96* (1996), pp. 1-18 located at http://www.cs.unc.edu/~barman/HT96/P71/Groenbaek-Trigg.html.

Halasz, F. "Reflections on NoteCards: Seven Issues for the Next Generation of Hypermedia Systems." *Hypertext '87 Proceedings* (Nov. 13-15, 1987), reprinted in *Communications of the Association for Computing Machinery* (Jul. 1988) 31(7):345-365.

Halasz, F. and M. Schwartz "The Dexter Hypertext" *Communications of the ACM* (Feb. 1994) 37(2):30-39.

Hall, W. et al. *Rethinking Hypermedia: The Microcosm Approach* (1996) Kluwer Academic Publishers, Boston, MA.

Hardman, L. et al. "The Amsterdam Hypermedia Model: Adding Time and Context to the Dexter Model." *Communications of the ACM* (Feb. 1994) 37(2):50-62.

Helmbold, D.P. et al. "Detecting Data Races from Sequential Traces" *Proceedings of the 24th Annual Hawaii International Conference on Systems Sciences* (Jan. 8-11, 1991) 2:408-417.

Helmbold, D.P. "Determining Possible Event Orders by Analyzing Sequential Traces" *IEEE Transactions on Parallel and Distributed Systems* (Jul. 1993) 4(7):827-840.

Hinden, R., et al. "Format for Literal IPv6 Addresses in URL's." Internet Engineering Task Force (Dec. 1999) located at http://www.ietf.org/rfc/rfc2732.txt.

Hsu, W. W. et al. "I/O Reference Behavior of Production Database Workloads and the TPC Benchmarks—An Analysis at the Logical Level" *ACM Transactions on Database Systems (TODS)* (Mar. 2001) 26(1):96-143.

Kahn, P. "Linking Together Books: Experiments in Adapting Published Material into Intermedia Documents" In *Hypermedia and Literary Studies* (1991) pp. 221-256, Paul Delany and George P. Landow, eds., MIT Press, Cambridge, MA.

Landow, G.P. "Relationally Encoded Links and the Rhetoric of Hypertext." *Proceedings of Hypertext '87* (Nov. 13-15, 1987) pp. 331-344.

Lassila, O. and R. Swick, eds. "Resource Description Framework (RDF) Model and Syntax Specification" World Wide Web Consortium (1999) pp. 1-46, located at http://www.w3.org/TR/REC-rdf-syntax/.

LeDoux, C. H. and D. S. Parker, Jr. "Saving Traces for ADA Debugging" *Proceedings of the 1985 Annual ACM SIGAda International Conference on Ada* (May 1985) V(2):97-108.

Le Hors, A. et al., eds. "Document Object Model (DOM) Level 2 Core Specification, Version 1.0" World Wide Web Consortium (WC2) (Nov. 1999), located at http://www.w3.org/TR/DOM-Level-2-Core/.

Lencevicius, R. et al. "Third Eye—Specification-Based Analysis of Software Execution Traces" *Proceedings of the 22nd International Conference on Software Engineering* (Jun. 2000) p. 772.

Lo, J. L. et al. "An Analysis of Database Workload Performance on Simultaneous Multithreaded Processors" *Proceedings of the 25Annual International Symposium on Computer Architecture* (Apr. 1998) 26(3):39-50.

Maler, E. and S. DeRose, eds. "XML Linking Language (XLink)" World Wide Web Consortium (Mar. 1998) pp. 1-15, located at http://www.w3.org/TR/1998/WD-xlink-19980303.

Marsh, J., ed. "XML Base (XBase)" World Wide Web Consortium (Dec. 1999) pp. 1-6, located at http://www.w3.org/TR/1999/WD-xmlbase-19991220.

Marshall, C.C. et al. "VIKI: Spatial Hypertext Supporting Emergent Structure" *Proceedings of the 1994 European Conference on Hypertext (ECHT '94)* (Sep. 1994) pp. 13-23.

Meyrowitz, N. "Intermedia: The Architecture and Construction of an Object-Oriented Hypermedia System and Applications Framework" *Proceedings of OOPSLA.* (Sep. 1986) 186-201.

Miller, B.P. and J.-D. Choi "A Mechanism for Efficient Debugging of Parallel Programs" *Proceedings of the ACM SIGPLAN 1998 Conference on Programming Language Design and Implementation* (Jun. 1988) pp. 135-144.

Nelson, T.H *Literary Machines 93.1* (1992) Mindful Press, Sausalito, CA.

Palnitkar, S. et al. "Finite State Machine Trace Analysis Program" *International Verilog HDL Conference* (Mar. 14-16, 1994) pp. 52-57.

Pemberton, S. et al. "XHTML 1.0: The Extensible HyperText Markup Language" World Wide Web Consortium (Jan. 2000) pp. 1-22, located at See http://www.w3.org/TR/2000/REC-xhtml1-20000126/.

Raggett, D. et al., "HTML 4.01 Specification". World Wide Web Consortium (Dec. 1999) pp. 1-12, located at http://www.w3.org/TR/html4/.

Rahm. E. "Empirical Performance Evaluation of Concurrency and Coherency Control Protocols for Database Sharing Systems" *ACM Transactions on Database Systems (TODS)* (Jun. 1993) 18(2):333-377.

Ramakrishnan, K. K. "Analysis of File I/O Traces in Commercial Computing Environments" *Proceedings of the 1992 ACM SIGMETRICS Joint International Conference on Measurement and Modeling of Computer Systems* (Jun. 1992) 20(1):78-90.

Reiss, S.P. and M. Renieris "Generating Java Trace Data" *Proceedings of the ACM 2000 Conference on Java Grande* (Jun. 2000) pp. 71-77.

Singhal, V. and A.J. Smith "Analysis of locking behavior in three real database systems" *The VLDB Journal* (1997) 6:40-52.

Tolujev, J. et al. "Assessment of Simulation Models Based on Trace-File Analysis: A Metamodeling Approach" *Proceedings of the 30th Conference on Winter Simulation* (Dec. 1998) pp. 443-450.

Trigg, R.H. "Guided Tours and Tabletops: Tools for Communicating in a Hypertext Environment." *ACM Transactions on Office Information Systems,* (Oct. 1988) 6(4):398-414.

Trigg, R.H. "From Trailblazing to Guided Tours: The Legacy of Vannevar Bush's Vision of Hypertext Use" In *From Memex to Hypertext: Vannevar Bush and the Mind's Machine* (1991) pp. 353-367, James M. Nyce and Paul Kahn, eds, Academic Press, Inc., San Diego, CA.

van Ossenbruggen, J. et al. "The Role of XML in Open Hypermedia Systems." (Position paper for the 4th Workshop on Open Hypermedia Systems) *Hypertext '98* , pp. 106, located at http://aue.auc.dk/~kock/OHS-HT98/Papers/ossenbruggen.html.

Whitehead, E. "XML Media Types" Internet Engineering Task Force (Jul. 1998) pp. 1-15, located http://www.ietf.org/rfc/rfc2376.txt.

Yankelovich, N. et al. "Intermedia: The Concept and the Construction of a Seamless Information Environment." *IEEE Computer* (Jan. 1988) 21(1):81-96.

Yankelovich, N. et al. "Reading and Writing the Electronic Book." *IEEE Computer* (Oct. 1985) 18(10):15-30.

Yergeau, F. "UTF-8, a transformation format of ISO 10646" Internet Engineering Task Force (Jan. 1998) pp. 1-10, located at http://www.ietf.org/rfc/rfc2279.txt.

Zellweger, P.T. "Scripted Documents: A Hypermedia Path Mechanism." *Proceedings of Hypertext '89* (Nov. 1989), pp. 1-14.

Sperberg-McQueen C.M. and L. Burnard, eds., *Guidelines for Electronic Text Encoding and Interchange* (1994) Association for Computers and the Humanities (ACH), Association for Computational Linguistics (ACL), and Association for Literary and Linguistic Computing (ALLC), TEI P3 Text Encoding Initiative, Chicago, Oxford.

Chatterjee, Sunojit, "Trace Navigation and Analyzer Tool Prototype (High Level Design: First Draft" Apr. 12, 2000.

\* cited by examiner

US 7,200,588 B1

METHOD AND MECHANISM FOR ANALYZING TRACE DATA USING A DATABASE MANAGEMENT SYSTEM

BACKGROUND AND SUMMARY

Tracing is an approach for logging the state of computer applications at different points during its course of execution. Tracing is normally implemented by inserting statements in the computer application code that outputs status/state messages ("traces") as the statements are encountered during the execution of the code. Statements to generate traces are purposely placed in the computer application code to generate traces corresponding to activities of interest performed by specific sections of the code. The generated trace messages can be collected and stored during the execution of the application to form a trace log.

Programmers often use tracing and trace logs to diagnose problems or errors that arise during the execution of a computer application. When such a problem or error is encountered, trace logs are analyzed to correlate trace messages with the application code to determine the sequence, origin, and effects of different events in the systems and how they impact each other. This process allows analysis/diagnoses of unexpected behavior or programming errors that cause problems in the application code.

However, often times, tracing can generate a very large amount of data in the trace logs. In such a case, to simply use a text editor to open, view, and analyze the data in the trace logs may be incredibly difficult—in some cases, the amount of data is so large that a conventional text editor cannot even open it. One approach to facilitate in analyzing the data is to utilize a scripting tool, which converts or parses the data into a more readable format, but some of the difficulties may still exist in analyzing large amounts of trace data. For example, when the scripting tool parses or converts the data into a desired format, the scripting tool operates on the data sequentially, from the beginning of the trace log to the end. For large trace logs, this may take a substantial amount of time. Furthermore, scripting tools generally require scripts that search for specific strings or precise patterns within the trace log in order to parse the data for analysis of a problem. However, often times it is desirable to be able to search for data that cannot be characterized in precise patterns or search strings.

The present invention provides a method and mechanism for analyzing trace data using a database management system (DBMS), such as relational database management system (RDBMS). According to an embodiment, trace data may be loaded onto one or more databases within a DBMS. With this aspect of the invention, several advantages are gained, including the ability to use the query tool of the DBMS or the power of a database query language, such as SQL, to analyze the trace data and the ability to build a trace repository to analyze the history of the trace data. Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Figure 1:
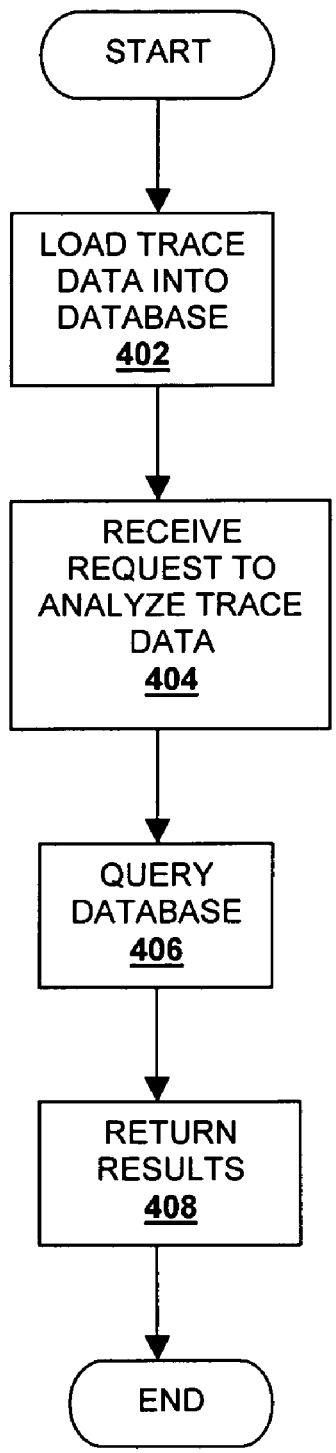
FIG. 1 is a flowchart of an embodiment of a process for analyzing trace data using a database management system.

The present invention is disclosed in a number of different embodiments as methods and mechanisms for analyzing trace data using a database management system (DBMS). Some of the embodiments described include relational database management systems (RDBMS) that support the Structured Query Language (SQL). However, the principles presented here are applicable to any DBMS on any computer platform, and thus the scope of the invention is not to be limited to the exact embodiments shown herein.

Generally, tracing may cause a very large amount of data to be collected within a trace log or within multiple trace logs. In such a case, to analyze the trace log(s) from the beginning of the log(s) to the end may be burdensome and inefficient. This inefficiency is further exasperated by the circumstance of having to analyze and correlate several trace logs together for interrelated operations, and their resultant traces, that occur across multiple or parallel network nodes. To help alleviate the burden, the data in the trace log may be loaded onto one or more databases within a DBMS. A database is generally a collection of data. A DBMS is the application that allows databases to be defined, constructed and manipulated.

Loading the trace data onto one or more databases within a DBMS provides several advantages. One advantage is that a DBMS typically includes a query tool or language, such as SQL, which allows complex and sophisticated queries to be applied to the trace data. Further, the one or more databases may be relational databases, in which queries may be based on the relationship between different trace records within the trace data. In addition, when the queries are executed, the search does not have to be performed sequentially from the beginning of the data to the end, as in the case of trace data residing in a conventional trace log. Instead, the search may be done through one or more related tables containing related trace data, which may improve the efficiency of trace analysis.

Another advantage is that analysis of the trace data may be "off-line". In other words, there is no need for tracing to be in operation on the source system when analyzing the trace data since the data is loaded onto a separate database for analysis, independent of tracing operation at the source system. In addition, tracing can be performed in a "platform neutral" manner, in which the trace analysis procedures are performed at a different network node/platform from the node/platform that originally generated the trace records. This is particularly advantageous for allowing trace records from different network nodes to be collected into a DBMS and analyzed as a group. Moreover, the approach allows better problem tracking and identification within the repository.

Using databases further allows the ability to develop a repository for the trace data, which allows for historical analysis of the trace data. Often times, the root cause of a problem may be discovered by analyzing the historical pattern of a component being traced over a long period of time. Databases generally have a much larger storage capacity than conventional trace logs, and in the case of the relational database, the data may be stored in relational tables, which, as will be described below, allows the data to be stored in a more coherent fashion.

FIG. 1 is a high-level flowchart of an embodiment of the invention. At 402, trace data from one or more trace logs are loaded into a database. Once the trace data has been loaded into a database, it can be accessed and queried like any other set of data within a database. At 404, a request is received to analyze the trace data loaded into the database. As noted above, a significant advantage of the present approach is that a DBMS typically includes a query tool or language, such as SQL, which allows complex and sophisticated queries to be applied to the trace data. The database is queried, e.g., using a SQL query, to fulfill the request for analyzing the trace data (406). At 408, the query results are returned to the requesting entity.

Figure 2:
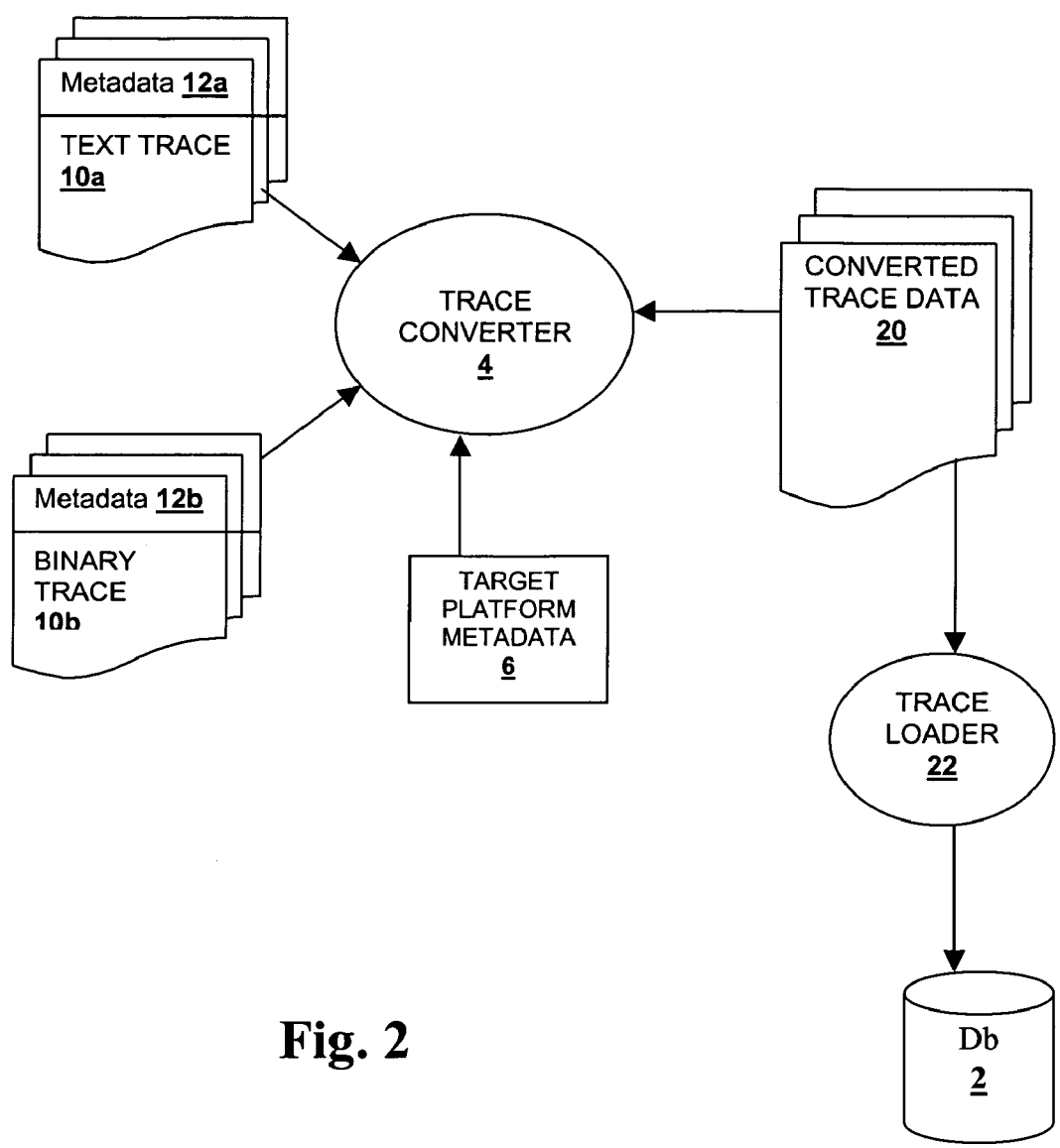
FIG. 2 illustrates a system for loading trace data onto a database according to an embodiment of the invention.

Turning to FIG. 2, a method of loading trace data onto one or more target databases within a DBMS is illustrated. A database 2 may reside on a particular computer platform, hereinafter referred to as the "target platform", that is different from the one or more computer platforms that the trace data is generated on, hereinafter referred to as the "source platform". Alternatively, the database 2 may exist on the same computer platform as the source platform.

Generally, during tracing, trace data may be collected in one or more trace logs or files 10*a* and 10*b* on the source platform(s). Because of differences in data or platform-dependant configurations between the source platform and the target platform, it is possible that the trace data in the trace logs 10*a* and 10*b* may need to undergo a conversion process before being loaded into the database 2. For example, text data in the trace logs on the source platform may be encoded using the EBCDIC format, while the target platform uses the ASCII encoding format, or vice-versa. A suitable conversion process can be employed to convert text between different text formats. Another example relates to byte ordering—it is possible that the source platform uses little-endian ordering while the target platform uses big-endian ordering, or vice-versa, which may also call for a conversion process to ensure proper byte-ordering before the trace data is loaded into the database 2.

Conversion may also occur if the target platform uses preferred data formats that are different than the data formats used in the originating trace logs. For example, in an embodiment, it is contemplated that the preferred format for maintaining trace data in the database 2 is the textual format. In many circumstances, maintaining the trace data in text form improves the readability and accessibility of the trace data. If the target database 2 expects the trace data in text format, but the trace data from the trace logs 10*a* and 10*b* are in another format, e.g., binary format, then some or all of the trace data in these other formats can be suitably converted into the desired textual format. As just one example, trace data is often collected in binary or octal "memory dumps" or "core dumps", which are snapshots of the contents in the memory of a computer system written to a trace log or file. These memory or core dumps are often created when a process within a computer system terminates unexpectedly, and a large amount of debugging information, e.g., trace data, may reside within the memory of the computer system at the time the process terminated. Thus, it may be desirable to save the contents of the memory at the occurrence of the termination and load this data into the database 2 for later failure analysis. If the trace data is already in the proper text format and the source platform is substantially the same as the target platform, then conversion may not be necessary, and the trace data may be directly loaded onto the database. It is noted that other preferred formats at the target platform, in addition to textual formats, are expressly contemplated as being within the scope of the present invention.

A trace converter 4 can be used to convert trace data from trace logs 10*a* and 10*b* into suitable formats for loading into database 2. Different trace data or trace logs may undergo different types of conversions. For example, if the supported or preferred format at the database 2 is the text format, then the text-based trace data in trace logs 10*a* may only undergo conversion related to platform-dependant characteristics, e.g., byte-ordering or EBCDIC to ASCII conversions. However, the binary-based trace data in trace logs 10*b* may need to undergo additional conversions to convert the binary data to a textual format.

In an embodiment, the header portions 12*a* and 12*b* of trace logs 10*a* and 10*b*, respectively, comprise metadata identifying data, file or platform-dependant configuration/structure information for trace data in these trace logs. This metadata can be used to identify whether and how conversion should be performed upon the trace data. For example, the metadata could comprise information regarding the text encoding formats or byte-ordering of the particular source platform corresponding to the trace logs 10*a* and 10*b*. Embedding this type of metadata into the header portions of the trace log is particularly desirable if the trace converter 4 resides on a different node from the node that originated the trace log, since this allows the trace log itself to be self-descriptive with respect to its particular data characteristics. The trace converter 4 may, however, reside on the same node as the originating node for the trace log. In an alternate embodiment, the metadata can be separately recorded or sent to the trace converter 4, and is not embedded into the header portion of the trace logs.

Target platform metadata 6 is accessed by the trace converter 4, in conjunction with the metadata 12*a*–*b* for the trace data, to determine whether and how the trace data should be converted. In an embodiment, the target platform metadata 6 identifies data, file or platform-dependant configuration/structure information for the target platform, as well as preferred formats for trace data to be loaded into the database 2 on the target platform. In effect, the target platform metadata 6 allows a mapping to be identified at the trace converter 4 between the original formats for the trace data and the expected formats at the database 2. It is noted that if the trace data in the trace log 10*a* is already in a suitable data format, then conversion may not need to be performed upon that trace data before it is loaded into the database 2.

This approach allows for a platform independent environment, i.e., there is no need for the target platform and source platform to be the same. Further, the method supports any type of tracing and any type of format. Thus, the trace data may be of any format or structure, independent of the type or structure of the one or more databases. In addition, any DBMS may be used to store the trace data.

After conversion, if conversion is necessary, the trace data is stored into trace files 20.

A trace loader 22 then loads the trace data within trace files 20 into the database 2. In an embodiment, database 2 is part of a relational database management system (RDBMS). Generally, in an RDBMS, data is presented as a collection of "entities", "attributes", and "relationships", represented as "relational tables". The "entities" are data objects and the "attributes" are the attributes of the entities. The "relationships" are the relationships defined between the different entities. A "relational table" represents the entities and the relationships between the entities in the database and has its own unique identification "key". The entities, attributes, and relationships define the structure of the relational tables and could be defined for the trace data. The trace data may be characterized as a set of trace records, and each trace record may be represented as an entity.

When the trace data is loaded onto the one or more databases, the trace data is parsed, organized into entities, attributes, and relationships, and loaded onto one or more relational tables, such as the one described below, within the one or more databases of the target RDBMS. An example table structure representing the trace record is as follows:

| Event | INTEGER |
|---|---|
| Opcode | INTEGER |
| Time | INTEGER |
| Sequence Number | INTEGER |
| SID | INTEGER |
| PID | INTEGER |
| InstanceName | VARCHAR (20) or CHAR(20) |
| ProcName | VARCHAR (15) or CHAR(20) |
| OSPID | INTEGER |
| Data | VARCHAR (192) or CHAR(192) |

In this example table structure, the structure of the trace record, i.e. the entity, is defined having several attributes. The first attribute, Event, is the identification of a particular event for which a trace is being logged, which is represented as an integer value. The second attribute is a particular operational code, Opcode, identified by an integer value. Another attribute is the particular time, Time, of the occurrence, again identified by an integer value. The next attribute is the sequence number, Sequence Number, of the trace record relative to the other trace records created during the tracing process, represented as an integer value. The next attribute is the session identification, SID, which identifies the particular session of the application being traced, identified as an integer. The next attribute is the process identification, PID, which identifies the particular process of the application being traced, identified as an integer.

The next attribute is the name of the instance of the application being traced, InstanceName, which is identified by a variable string, or character string, of a maximum of twenty characters, VARCHAR (20) or CHAR(20). Next is the name of the process traced within the application, ProcName, identified by a variable string, or character string, of a maximum of five characters, VARCHAR (5) or CHAR(20). Following is the identification of the operating system process of the application being traced, OSPID, identified by an integer value. The final attribute is applicable data collected at that instance, such as the name of the function within the application operating during that instance and the value of the variables used by those functions. In this example, a variable string, or character string, of a maximum of 192 characters is reserved for the trace record.

Figure 3:
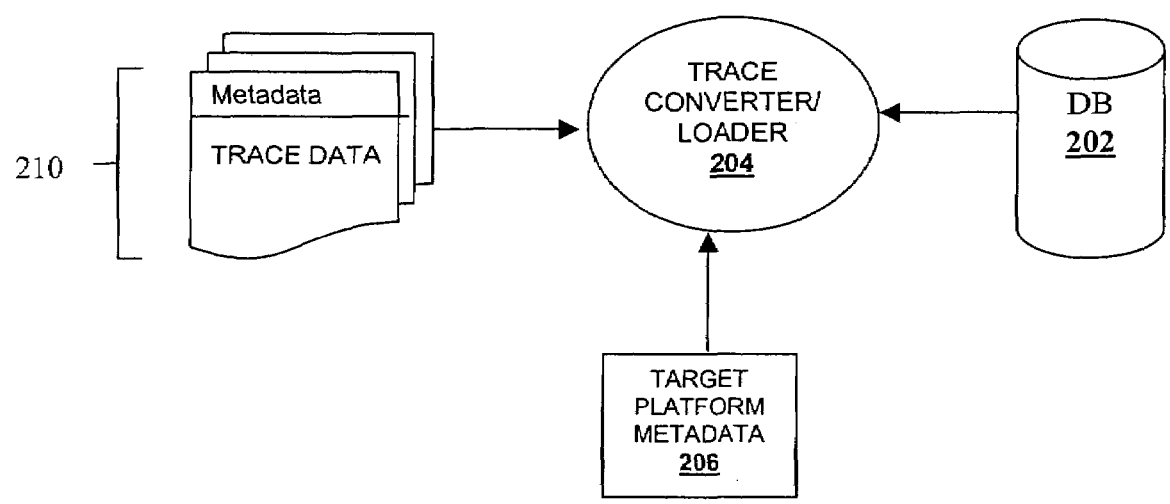
FIG. 3 illustrates an alternate approach for loading trace data onto a database according to an embodiment of the invention.

FIG. 3 shows an alternate embodiment of the invention, in which the trace data from trace logs 210 are sent to a trace converter/loader 204, which directly loads converted trace data into the database 202 without performing the intermediate step of creating converted trace files 20.

Figure 4:
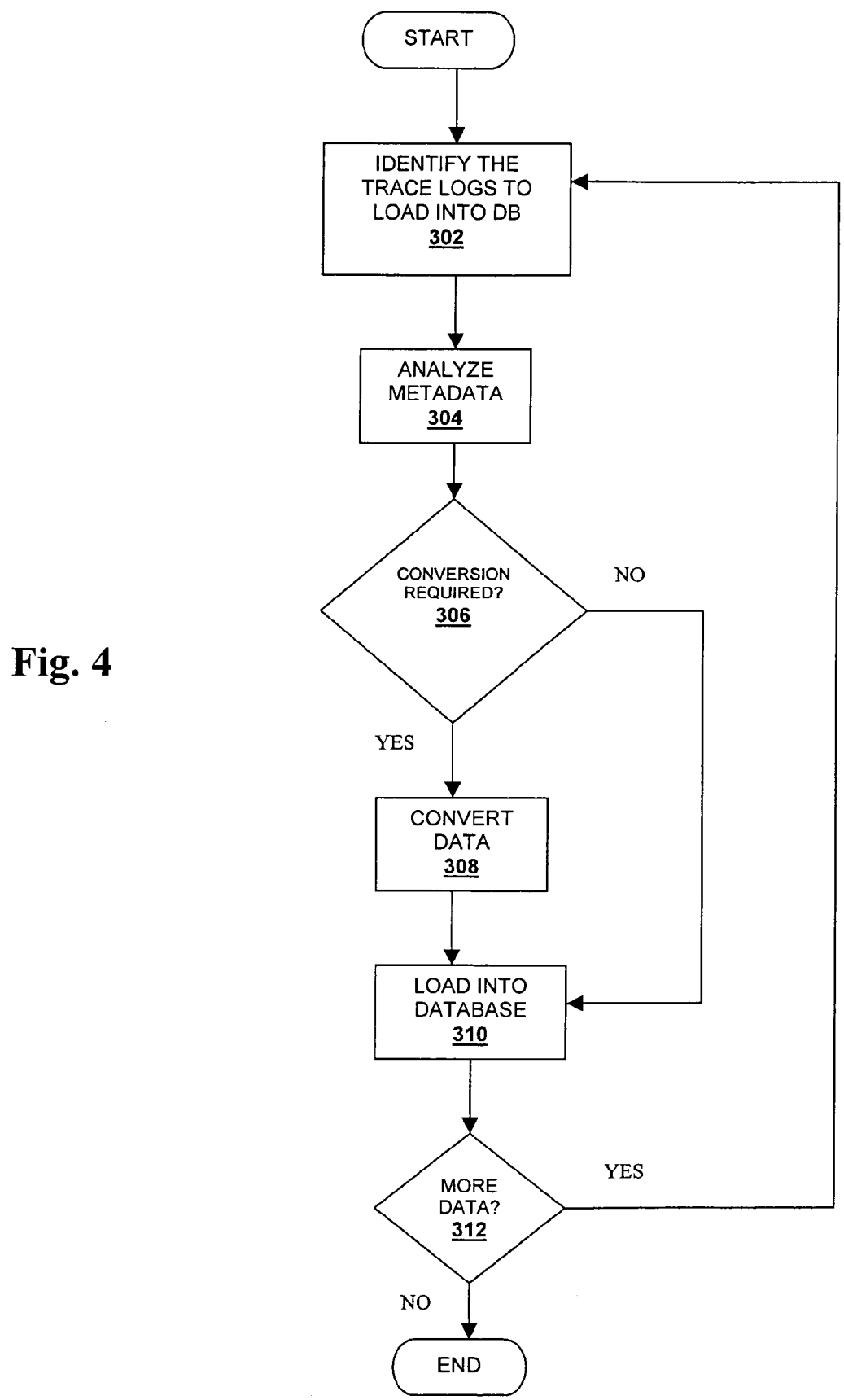
FIG. 4 is a flowchart of an embodiment of a process for loading trace data onto a database.

FIG. 4 shows a flowchart of an embodiment of the invention for loading trace data into a database. At 302, an identification is made of the trace logs containing trace data to be loaded into the database.

At 304, metadata is analyzed to identify the data/platform-dependant characteristics and structures of the source and target platforms. A determination is made whether and how conversion is to be applied to the trace data within the trace logs (306). If conversion is needed, then a suitable conversion process is applied against the trace data (308).

The trace data, which has been converted if conversion is necessary, is thereafter loaded into the database (310). Turning to FIG. 2, an embodiment in accordance with the present invention is illustrated. As noted above, a trace loader may be configured to load trace data that is in proper format onto a database within a DBMS. In the case of an RDBMS, the trace loader will first identify which data table the trace data will be inserted into. The user may define the data table and may modify the table if there are any changes made to the structure of the trace data, e.g., changes made to the structure of the trace record. If additional trace data is to be loaded into the database (312), then the process returns back to 302.

SYSTEM ARCHITECTURE OVERVIEW

Figure 5:
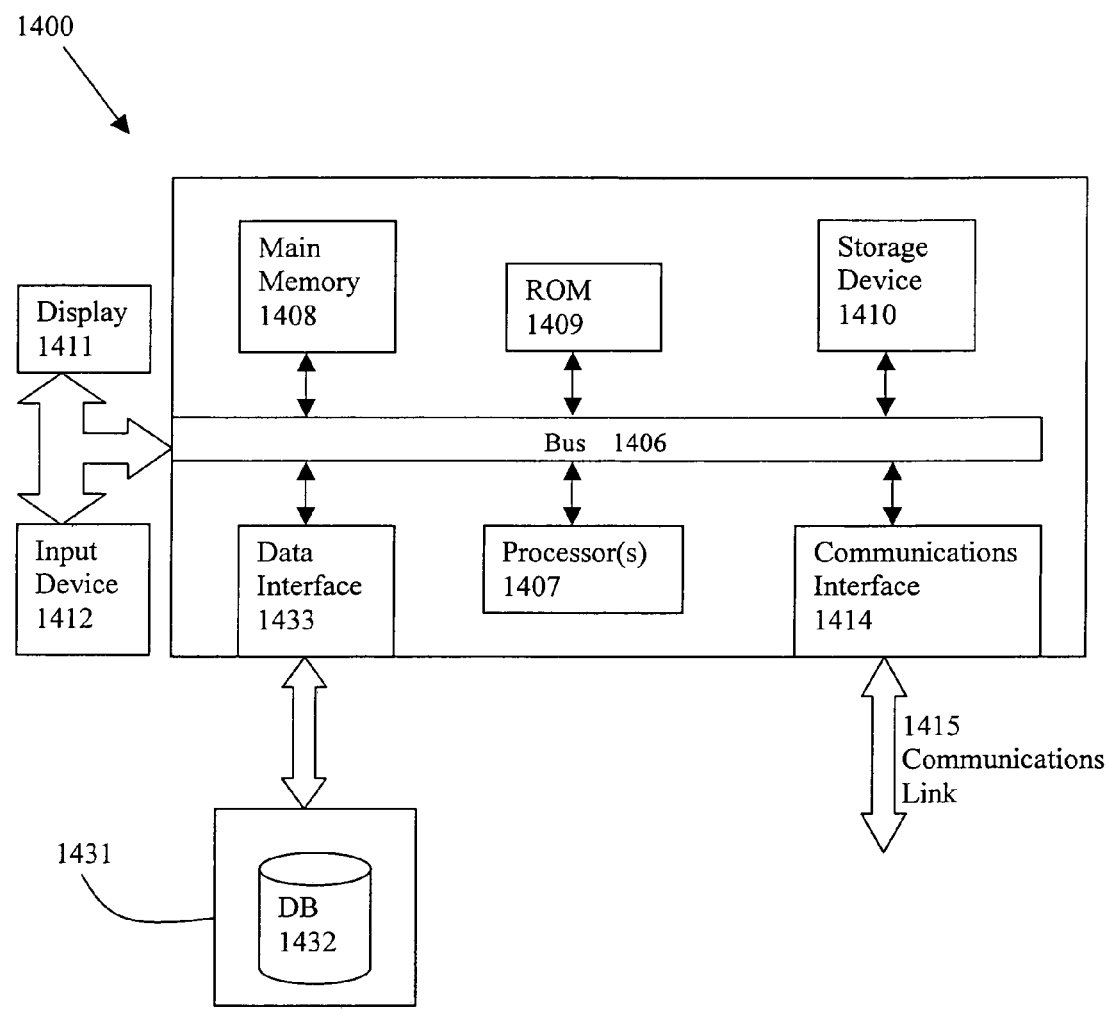
FIG. 5 is a diagram of a system architectures with which the present invention may be implemented.

The execution of the sequences of instructions required to practice the invention may be performed in embodiments of the invention by a computer system 1400 as shown in FIG. 5. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 5, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams or elements in system diagrams described herein are merely illustrative, and the invention can be performed using different or additional actions/elements, or a different combination or ordering of process actions or elements. The specification and drawings are, accordingly, to be regarded in an illustrative rather than restrictive sense.

The invention claimed is:

1. A method for preparing and analyzing trace data collected in a trace log, comprising:

extracting trace data from one or more trace logs, the trace data being a set of information output by statements inserted into a computer application code to monitor specific sections of the code;

loading the trace data onto one or more databases within a database management system, wherein the database management system defines, constructs, and manipulates databases;

receiving a request to analyze trace data;

querying the database management system to analyze the trace data; and returning query results, the query results based upon querying the database management system to analyze the trace data.

2. The method of claim 1, wherein the one or more databases are relational databases.

3. The method of claim 1, further comprising:

determining whether the trace data needs to be converted from a first format to a second format; and converting the trace data from the first format into the second format.

4. The method of claim 3, wherein the second format is a textual format.

5. The method of claim 3, wherein the first format is a binary format.

6. The method of claim 1, further comprising:

using meta-data to convert trace data from a first format into a second format.

7. The method of claim 6 in which the meta-data is embedded within the trace log.

8. The method of claim 6 in which the meta-data comprises information about the computer platform for the database management system.

9. A method for preparing and analyzing trace data collected in a trace log, comprising:

extracting trace data from the trace log, the trace data being a set of information output by statements inserted into a computer application code to monitor specific sections of the code;

storing the trace data into one or more trace files;

loading the trace data from the one or more trace files onto one or more databases within a database management system, wherein the database management system defines, constructs, and manipulates databases;

receiving a request to analyze trace data;

querying the database management system to analyze the trace data; and returning query results, the query results based upon querying the database management system to analyze the trace data.

10. The method of claim 9, wherein the one or more databases are relational databases.

11. The method of claim 9, further comprising:
determining whether the extracted data needs to be converted from a first format to a second format; and
converting the trace data from the first format to the second format.

12. The method of claim 11, wherein the second format is a textual format.

13. The method of claim 9, further comprising:
using meta-data to convert trace data into from a first format to a second format.

14. The method of claim 13 in which the metadata is embedded within the trace log.

15. The method of claim 13 in which the metadata comprises information about the computer platform for the database management system.

16. A system for preparing and analyzing trace data collected in a trace log using a database within a database management system, comprising:
a trace loader configured for
extracting the trace data from the trace log, the trace data being a set of information output by statements inserted into a computer application code to monitor specific sections of the code; and
loading the trace data onto one or more relational tables in the database, within a database management system, wherein the database management system defines, constructs, and manipulates databases; and
an analyzer configured for
receiving a request to analyze trace data;
querying the database management system to analyze the trace data; and
returning query results, the query results based upon querying the database management system to analyze the trace data.

17. The system of claim 16, wherein the trace loader is further configured for storing the trace data into one or more trace files.

18. The system of claim 16 further comprising a trace converter for converting the trace data from a first format to a second format.

19. The system of claim 18 wherein the trace converter uses metadata to convert the trace data.

20. The system of claim 19 in which the metadata is embedded within the trace log.

21. A computer program product that includes a computer-usable medium having a sequence of instructions which, when executed by a processor, causes said processor to execute a process for preparing and analyzing trace data collected in a trace log, said process comprising:
extracting trace data from one or more trace log, the trace data being a set of information output by statements inserted into a computer application code to monitor specific sections of the code;
loading the trace data onto one or more databases within a database management system, wherein the database management system defines, constructs, and manipulates databases;
receiving a request to analyze trace data;
querying the database management system to analyze the trace data; and
returning query results, the query results based upon querying the database management system to analyze the trace data.

22. The computer program product of claim 21, further comprising querying the trace data in the database management system to analyze the history of the trace data.

23. A system for preparing and analyzing trace data collected in a trace log, said system comprising:
means for extracting trace data from the trace log, the trace data being a set of information output by statements inserted into a computer application code to monitor specific sections of the code;
means for loading the trace data onto one or more databases within a database management system, wherein the database management system defines, constructs, and manipulates databases;
means for receiving a request to analyze trace data;
means for querying the database management system to analyze the trace data; and
means for returning query results, the query results based upon querying the database management system to analyze the trace data.

24. The system of claim 23, further comprising means for querying the trace data in the database management system to analyze the history of the trace data.

25. A method for analyzing trace data collected in a trace log for analysis, comprising:
receiving a request to analyze trace data, the trace data loaded into a database management system from the trace log, the trace data being a set of information output by statements inserted into a computer application code to monitor specific sections of the code, wherein the database management system defines, constructs, and manipulates databases;
querying the database management system to analyze the trace data; and
returning query results, the query results based upon querying the database management system to analyze the trace data.

26. The method in claim 25, further comprising building a trace repository for the trace data to analyze the history of the trace data.

27. The method of claim 25, further comprising storing the trace data into one or more trace files.

28. The method of claim 25 wherein the trace data is in a first format while stored in the trace log and is in a second format while stored in the database management system.

29. The method of claim 28 in which the trace data undergoes conversion between the first format and the second format.

30. The method of claim 29 in which metadata is employed for the conversion.

31. The method of claim 30 in which the metadata is embedded within the trace log.

32. The method of claim 30 in which the metadata comprises information about the computer platform for the database management system.

33. A system for analyzing trace data collected in a trace log for analysis, comprising:
means for receiving a request to analyze trace data, the trace data loaded into a database management system from the trace log, the trace data being a set of information output by statements inserted into a computer application code to monitor specific sections of the codes, wherein the database management system defines, constructs, and manipulates databases;

means for querying the database management system to analyze the trace data; and means for returning query results, the query results based upon querying the database management system to analyze the trace data.

34. The system in claim 33, further comprising a means for building a trace repository for the trace data to analyze the history of the trace data.

35. The system of claim 33, further comprising means for storing the trace data into one or more trace files.

36. A computer program product that includes a computer-usable medium having a sequence of instructions which, when executed by a processor, causes said processor to execute a process for analyzing trace data collected in a trace log for analysis, said process comprising:

receiving a request to analyze trace data, the trace data loaded into a database management system from the trace log, the trace data being a set of information output by statements inserted into a computer application code to monitor specific sections of the code, wherein the database management system defines, constructs, and manipulates databases;

querying the database management system to analyze the trace data; and returning query results, the query results based upon querying the database management system to analyze the trace data.

37. The computer program product of claim 36, further comprising building a trace repository for the trace data to analyze the history of the trace data.

38. The computer program product of claim 36, further comprising storing the trace data into one or more trace files.

* * * * *